United States Patent
Tsuzuki et al.

(10) Patent No.: US 8,820,573 B2
(45) Date of Patent: Sep. 2, 2014

(54) MECHANISM TO HOLD COVER OPEN OR CLOSED

(75) Inventors: Kazuhiro Tsuzuki, Tokyo (JP); Masahiro Kanamaru, Tokyo (JP); Jiro Yoshizawa, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 267 days.

(21) Appl. No.: 13/319,094

(22) PCT Filed: Aug. 24, 2009

(86) PCT No.: PCT/JP2009/004063
§ 371 (c)(1),
(2), (4) Date: Nov. 7, 2011

(87) PCT Pub. No.: WO2011/024210
PCT Pub. Date: Mar. 3, 2011

(65) Prior Publication Data
US 2012/0047848 A1    Mar. 1, 2012

(51) Int. Cl.
*B65D 43/16*    (2006.01)
*E05C 1/08*    (2006.01)

(52) U.S. Cl.
USPC .......... 220/835; 220/833; 220/264; 292/163; 292/341.15; 292/DIG. 4

(58) Field of Classification Search
USPC .......... 220/262–264, 810, 833–835; 292/137, 292/138, 163, 175, 145, 341.15, DIG. 4, 292/DIG. 11
See application file for complete search history.

(56) References Cited

U.S. PATENT DOCUMENTS

| 5,050,922 A | * | 9/1991 | Falcoff | ............... 296/37.7 |
| 2006/0290144 A1 | * | 12/2006 | Nakaya | ............... 292/262 |

FOREIGN PATENT DOCUMENTS

| JP | 49-3840 Y1 | 1/1974 |
| JP | 5-13233 B2 | 2/1993 |
| JP | 3559954 B2 | 9/2004 |

* cited by examiner

*Primary Examiner* — Fenn Mathew
*Assistant Examiner* — James N Smalley
(74) *Attorney, Agent, or Firm* — Birch, Stewart, Kolasch, & Birch, LLP

(57) ABSTRACT

As monitor 1 held by casing 3 is upwardly pushed, clamp 2 is rectilinearly moved toward push latch 4 in cooperation with rotation of the monitor 1, the monitor 1 is rotatable by claw section 2a disengaged from locking hole 1b, and a striker holding section 4a engages with striker 2b to be forced into the main body of the latch 4 to be in engagement locked position. As the opened monitor 1 is upwardly pushed, the clamp 2 is rectilinearly moved toward the latch 4 in cooperation with the rotation of the monitor 1, the holding section 4a placed in the locked position with the striker 2b is forced into the main body of the latch 4 to be in engagement-lock releasing position, and the released section 2a is urged and moved by spring 5 to lock the hole 1b to hold the monitor 1 in closed position.

6 Claims, 3 Drawing Sheets

MECHANISM TO HOLD COVER OPEN OR CLOSED

TECHNICAL FIELD

The present invention relates to a cover opening/closing and holding mechanism which opens and closes, and holds a heavy cover by a push action.

BACKGROUND ART

A casing including a cover (lid) to be opened and closed about a rotation shaft such as a retractable cover made of a resin is generally provided with a ready-made push latch as disclosed in Patent Document 1, and opens and closes the cover by a push action. A holding section is provided for the cover of the push latch attached to the casing, and a convex striker adapted to a concave shape of the holding section is provided for the other cover. In such a casing, as the cover in an opened position is pushed to a locking point while forcing the striker into the holding section, the push latch is in a locked position, and the cover is in a closed position by the engagement between the striker and the holding section. When the cover in the closed position is pushed, and the holding section together with the striker is pushed to a lock-releasing point, the push latch is lock released, and the holding section is tilted while being thrust back to be disengaged from the striker. Then, the cover is opened.

PRIOR ART DOCUMENTS

Patent Documents

Patent Document 1: Japanese Patent No. 3559954

SUMMARY OF THE INVENTION

Since the conventional cover opening/closing and holding mechanism is arranged as discussed above, there is a problem such that in the case of a casing where a heavy monitor or the like is opened or closed, a ready-made, small push latch mechanism cannot ensure a sufficiently large holding force. Therefore, a specific arrangement such as attaching a plurality of push latches or attaching a large push latch thereto is employed in order to ensure a holding force corresponding to the weight of the cover. However, in such an arrangement, it is necessary to use a large installing space in the casing; thus, there is a problem such that the external size of a product tends to be larger, which reduces the advantage of the product.

The present invention has been made to solve the above-mentioned problems, and an object of the invention is to provide a cover opening/closing and holding mechanism that can open and close a heavy cover by a push action, and hold the cover in a closed position through the use of a small push latch.

An aspect of the embodiments of the cover opening/closing and holding mechanism according to the present invention includes a cover that is substantially horizontally held by a casing, and also downwardly rotated about a rotation shaft to be opened; a cover locking hole formed in the face of a rotational distal end of the cover opposite to the side where the rotation shaft is provided; a clamp on one end side of which a clamp claw section for locking the cover locking hole is formed and on the other end side of which a striker is formed, and which is held by the casing to enable a reciprocating rectilinear motion; a push latch attached to the casing and having a striker holding section for engaging with the striker, wherein in cooperation with the upward rotation movement of the cover that is in the position held by the casing, the clamp is rectilinearly moved toward the push latch to thereby disengage the clamp claw section from the cover locking hole, thus making the cover rotatable and also the striker holding section engages with the striker to be forced into the main body of the push latch to be in an engagement locked position, and further in cooperation with the upward rotation movement of the cover that is in the opened position, the clamp is rectilinearly moved toward the push latch, and the striker holding section that is in the engagement locked position with the striker is forced into the main body of the push latch to be in an engagement-lock releasing position; and an urging unit that always urges the clamp toward the cover locking hole, moves the clamp by the engagement-lock releasing, and locks the clamp claw section in the cover locking hole to substantially horizontally hold the cover, wherein the clamp has a clamp operation section that contacts the cover to converge a rotational movement of the cover to a rectilinear movement of the clamp toward the push latch.

Further, another aspect of the embodiments of the cover opening/closing and holding mechanism according to the invention includes a cover that is substantially horizontally held by a casing, and also downwardly rotated about a rotation shaft to be opened; a cover locking hole formed in the face of a rotational distal end of the cover opposite to the side where the rotation shaft is provided; a clamp on one end side of which a clamp claw section for locking the cover locking hole is formed and on the other end side of which a clamp pivotal shaft for rotationally moving the clamp claw section is formed, wherein a striker is formed between the clamp claw section and the clamp pivotal shaft to be rotatably held by the casing; a push latch attached to the casing and having a striker holding section for engaging with the striker, wherein in cooperation with the upward rotation movement of the cover that is in the position held by the casing, the clamp is rotationally moved toward the push latch to thereby disengage the clamp claw section from the cover locking hole, thus making the cover rotatable and also the striker holding section engages with the striker to be forced into the main body of the push latch to be in an engagement locked position, and further in cooperation with the upward rotation movement of the cover that is in the opened position, the clamp is rotationally moved toward the push latch, and the striker holding section that is in the engagement locked position with the striker is forced into the main body of the push latch to be in an engagement-lock releasing position; and an urging unit that always urges the clamp toward the cover locking hole, moves the clamp by the engagement-lock releasing, and locks the clamp claw section in the cover locking hole to substantially horizontally hold the cover, wherein the clamp has a clamp operation section that contacts the cover to converge a rotational movement of the cover to a rotational movement of the clamp toward the push latch.

According to an aspect of the embodiments of the invention, the clamp is rectilinearly or rotationally moved in cooperation with the rotation of the cover to engagement-lock, or release the push latch, and also the clamp held by the casing is arranged to lock the cover to thereby restrain the push latch from having the load of the cover imposed thereon. Thus, it is possible to provide the cover opening/closing and holding mechanism, which can open and close a heavy cover by a push action, and further can hold the cover in a closed position through the use of a small push latch.

BRIEF DESCRIPTION OF THE DRAWINGS

FIG. 4(a) shows a closed position of a monitor, FIG. 4(b) shows an operation for opening the monitor, and FIG. 4(c) shows an operation for closing the monitor.

BEST MODE FOR CARRYING OUT THE INVENTION

In the following, embodiments of the present invention will be described with reference to the accompanying drawings in order to explain the present invention in more detail.

First Embodiment

Figure 1:
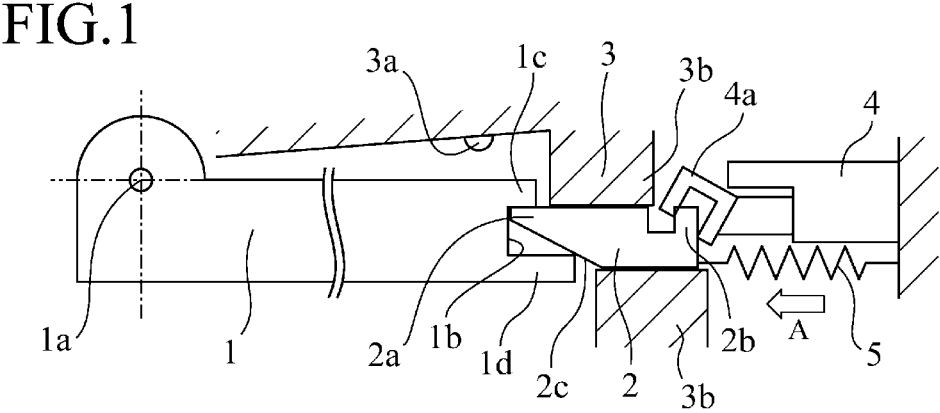
FIG. 1 is a side view showing an arrangement of a monitor opening/closing and holding mechanism according to a first embodiment of the present invention, and shows a closed position of a monitor.

FIG. 1 is a side view showing an arrangement of a monitor opening/closing and holding mechanism according to a first embodiment of the present invention, and shows a closed state of a monitor. In the first embodiment, a vehicle-mounted display apparatus is used as an example where the cover opening/closing and holding mechanism is applied. In the vehicle-mounted display apparatus, a casing 3 is secured to the face of a vehicle ceiling, and a monitor 1 is horizontally housed in the casing 3; upon viewing, the monitor 1 is rotated about a rotation shaft 1a to be opened in the direction of a gravitational force, and a monitor screen is oriented toward the side of a rear seat. Note that the parts of the monitor opening/closing and holding mechanism except for the ones necessary for the explanation of the mechanism are not shown in the figures.

A locking hole 1b is provided on the side of the rotational distal end of the monitor (cover) 1 opposite to the side where the rotation shaft 1a of the monitor is provided. The upper side of the locking hole 1b is referred to as an upper projecting section 1c and the lower side thereof is referred to as a lower projecting section 1d. Further, the lower projecting section 1d is longer than the upper projecting section 1c; when the monitor 1 is rotated, the upper projecting section 1c does not abut against a clamp 2, while the lower projecting section 1d abuts against the clamp.

The casing 3 is shown by hatching in FIG. 1. A stopper 3a is provided in the position of the casing 3 to come in contact with the casing, when the monitor 1 is pushed in the closing direction of the monitor. In the example, the stopper 3a is formed of a resilient body to prevent the monitor 1 from being damaged by an impact upon abutting against the casing 3. Moreover, a guide hole for passing the clamp 2 therethrough to enable a reciprocating rectilinear motion in a horizontal direction is prepared in the position where the casing 3 opposes the rotational distal end side of the monitor 1, and the peripheral face of the guide hole is defined as a guide section 3b for the clamp 2.

The clamp 2 has a claw section (clamp claw section) 2a for locking the locking hole (cover locking hole) 1b of the monitor 1; an oblique side section 2c where the bottom face of the claw section 2a is tapered toward the tip thereof; and a convex striker 2b adapted to a recess of a striker holding section 4a of a push latch 4. Hereupon, the lower projecting section 1d of the monitor 1 and the oblique side section 2c of the clamp 2 as a whole rectilinearly move the clamp 2 in cooperation with the rotating monitor 1. Furthermore, a spring (urging means) 5 is attached between the clamp 2 and the casing 3, and the spring 5 always applies to the clamp 2 a tension in the direction indicated by arrow A, that is, in the direction toward the locking hole 1b.

The push latch 4 is provided with the striker holding section 4a for engaging with the striker 2b of the clamp 2. The push latch 4 is attached to the casing 3 under conditions where the striker holding section 4a enables a reciprocating rectilinear motion in the horizontal direction indicated by arrow A. When the striker holding section 4a is pushed to a locking point in the direction opposite to that of the arrow A, the striker holding section 4a tilts to be in the position engaged with the striker 2b (engagement locked position). In the engagement locked position, when the striker holding section 4a is pushed to a lock-releasing point in the direction opposite to that of the arrow A, the striker holding section 4a tilts while being pushed back in the direction of the arrow A to be in the position disengaged from the striker 2b (engagement-lock released position), i.e., the position shown in FIG. 1. Hereupon, for the push latch 4, a ready-made, small push latch as shown in the prior art previously discussed has only to be used, and thus detailed descriptions thereof will be omitted.

Figure 2:
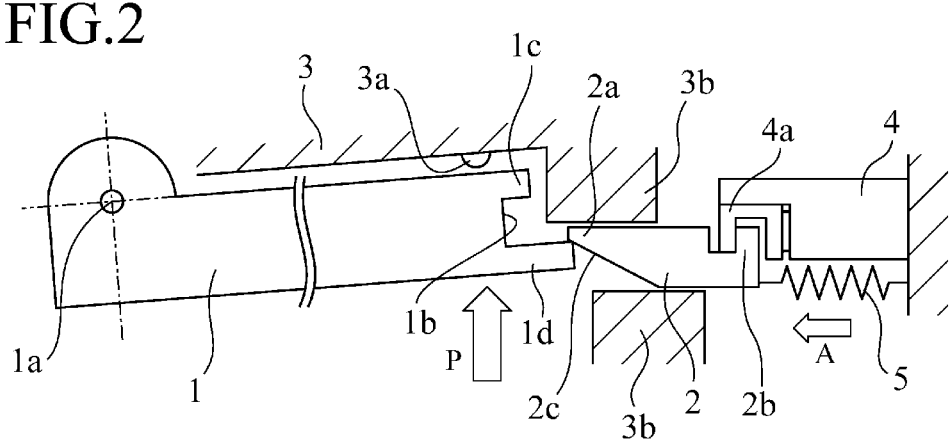
FIG. 2 is a side view explaining an operation for opening the monitor in the monitor opening/closing and holding mechanism shown in FIG. 1.
Figure 3:
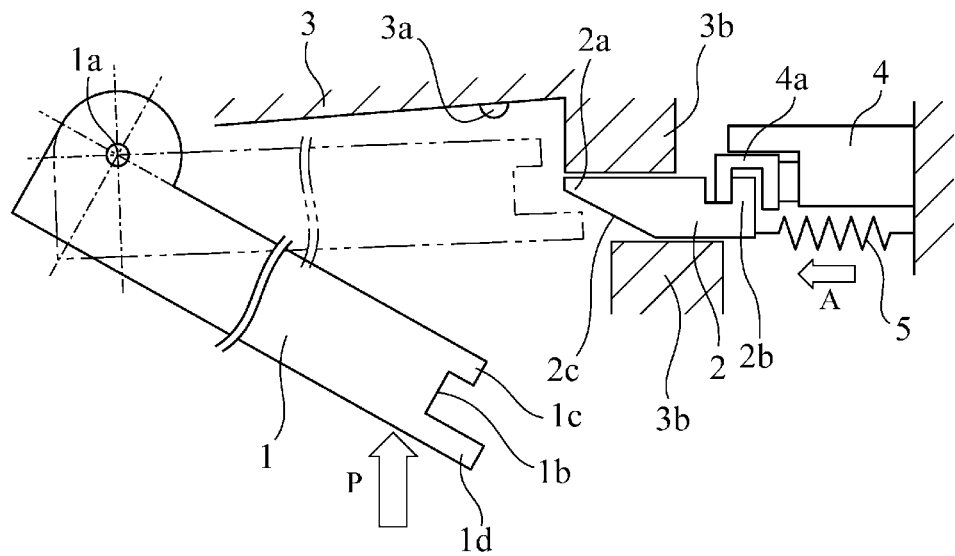
FIG. 3 is a side view explaining an operation for closing the monitor in the monitor opening/closing and holding mechanism shown in FIG. 1.

Next, the operation of the monitor opening/closing and holding mechanism will be described. FIG. 2 and FIG. 3 are side views of the monitor opening/closing and holding mechanism shown in FIG. 1; FIG. 2 shows an opening operation thereof, and FIG. 3 shows a closing operation thereof.

In opening the monitor 1, the side of the rotational distal end of the monitor 1 in the closed state by a user is upwardly (in the direction of arrow P) pushed as shown in FIG. 2. Then, the lower projecting section 1d provided in the monitor 1 pushes the oblique side section 2c of the clamp 2 against the tension of the spring 5 toward the push latch 4, and the clamp 2 is guided by the guide section 3b to be horizontally moved toward the push latch 4. At that time, the striker holding section 4a of the push latch 4 is tilted to engage with the striker 2b of the clamp 2, and be horizontally moved together with the clamp 2 while maintaining the engagement.

As the monitor 1 abuts against the stopper 3a to be stopped, the striker 2b of the clamp 2 is moved to a locking point of the push latch 4 to be in the position held by the striker holding section 4a. At that time, when a user stops pushing the monitor 1 in the direction of arrow P, the striker 2b of the clamp 2 is locked in the position (the position shown in FIG. 3) somewhat thrust back by the striker holding section 4a. When the push latch 4 is in the engagement locked position, the lock between the locking hole 1b of the monitor 1 and the claw section 2a of the clamp 2 is completely removed, and thus the monitor 1 can be released and opened downwardly.

In closing the monitor 1, as shown in FIG. 3, the side of the rotational distal end of the monitor 1 in the state opened by a user is upwardly (in the direction of arrow P) pushed. Since the engagement lock is maintained with the clamp 2 drawn by the push latch 4, the upper projecting section 1c of the monitor 1 passes through the oblique side section 2c and the claw section 2a of the clamp 2 without coming in contact with those sections, and the lower projecting section 1d that is longer than the upper projecting section 1c comes in contact with the oblique side section 2c. Then, the lower projecting section 1d pushes the oblique side section 2c of the clamp 2 against the tension of the spring 5 toward the push latch 4, and the clamp 2 is guided by the guide section 3b to be horizontally moved toward the push latch 4. At that time, the striker holding section 4a of the push latch 4 that is engaged with the striker 2b is also horizontally moved together with the clamp 2 to be pushed to the lock-releasing point. When the push latch 4 is lock-released, the lock-released clamp 2 is moved in the direction of arrow A by the tension of the spring 5, and the claw section 2a locks the locking hole 1b to hold the monitor 1 in the closed position. Therefore, even when a user stops pushing the monitor 1 in the direction of arrow P, the monitor remains in the closed position shown in FIG. 1.

When the monitor 1 is in the closed position, the load of the monitor 1 is applied to the clamp 2 and the guide section 3b of the casing 3, and the load is not applied to the push latch 4. Thus, the load applied to the push latch 4 is equal to the tension in the direction of arrow A of the spring 5. Therefore, when the strengths of the clamp 2 and the casing 3 supporting the clamp are secured, the heavy monitor 1 can be positively held even when the device receives external force such as vehicle vibration or the like, and further the monitor can be opened and closed with the push action.

Moreover, even when a small push latch 4 is used, a large holding force can be secured; thus, it becomes possible to dispose a monitor opening/closing and holding mechanism in a small mounting space within the casing 3, thereby implementing reduction in size of the product and increasing flexibility in design thereof.

As discussed above, according to the first embodiment, the monitor opening/closing and holding mechanism is arranged to include: the monitor 1 that is substantially horizontally held by the casing 3, and also downwardly rotated about the rotation shaft 1a to be opened; the locking hole 1b formed in the face of the rotational distal end opposite to the side where the rotation shaft 1a of the casing 3 is provided; the clamp 2 on one end side of which the claw section 2a for locking the locking hole 1b is formed and on the other end side of which the striker 2b is formed, and which is held by the guide section 3b of the casing 3 to enable the reciprocating rectilinear motion; the push latch 4 attached to the casing 3 and having the striker holding section 4a for engaging with the striker 2b, wherein in cooperation with the upward rotation movement of the monitor 1 that is in the position held by the casing 3, the clamp 2 is rectilinearly moved toward the push latch 4 to thereby disengage the claw section 2a from the locking hole 1b, thus making the monitor 1 rotatable, and also the striker holding section 4a engages with the striker 2b to be forced into the main body of the push latch 4 to be in the engagement locked position, and further in cooperation with the upward rotation movement of the monitor 1 that is in the opened position, the clamp 2 is rectilinearly moved toward the push latch 4, and the striker holding section 4a that is in the engagement locked position with the striker 2b is forced into the main body of the push latch 4 to be in the engagement-lock releasing position; the spring 5 that always urges the clamp 2 toward the locking hole 1b, moves the clamp 2 by the engagement-lock releasing, and locks the claw section 2a in the locking hole 1b to substantially horizontally hold the monitor 1; and the lower projecting section 1d and the oblique side portion 2c that rectilinearly move the clamp 2 toward the push latch 4 in cooperation with the monitor 1 to be rotationally moved.

Therefore, when the clamp 2 is engagement-locked and released with the push latch 4 in cooperation with the rotation of the monitor 1, and also the monitor 1 is locked by the clamp 2 held by the guide section 3b of the casing 3, it is possible to restrain the push latch 4 from being subjected to the load of the monitor 1. Thus, the heavy monitor 1 can be opened and closed by the push action through the use of the small push latch 4, and also held in the casing 3. Further, it becomes possible to secure a large holding force through the use of the small push latch 4; thus, it becomes possible to dispose the monitor opening/closing and holding mechanism in a small mounting space within the casing 3, thereby implementing reduction in size of the product and increasing flexibility in design thereof.

According to the first embodiment, the oblique side portion 2c is tapered toward the tip of the clamp 2 in such manner that the lower face of the claw section 2a of the clamp 2 is tapered toward the tip, and the lower projecting section 1d of the monitor 1 is arranged to abuts against the oblique side portion 2c when the monitor 1 is rotationally moved. Therefore, the clamp 2 can be operated in cooperation of the opening and closing of the monitor 1 by a simple arrangement.

Second Embodiment

Figure 4:
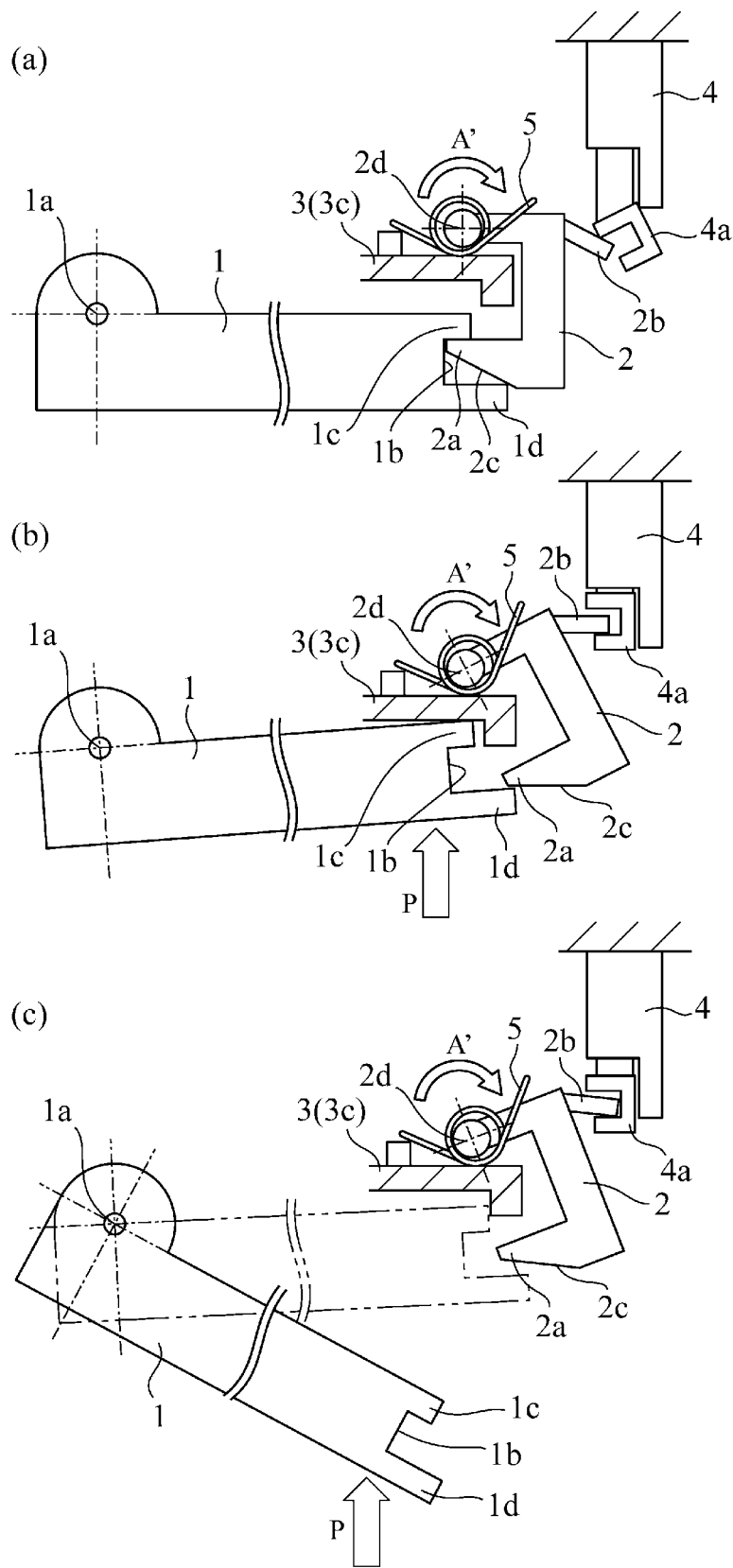
FIG. 4 is a side view showing an arrangement of a monitor opening/closing and holding mechanism according to a second embodiment of the invention.

The monitor opening/closing and holding mechanism of the first embodiment discussed above is arranged such that the clamp 2 is rectilinearly moved; however, in a second embodiment, it is arranged to be rotationally moved. FIG. 4 is a side view showing an arrangement of a monitor opening/closing and holding mechanism according to the second embodiment of the present invention; FIG. 4 (a) shows a closed state of a monitor 1, FIG. 4 (b) shows an opening operation of the monitor 1, and FIG. 4 (c) shows a closing operation of the monitor 1. Note that in FIG. 4, the same or equivalent parts as the ones in FIG. 1 to FIG. 3 are designated by similar numerals.

A pivotal shaft 2d is formed on one-end side of a clamp 2, and a spring 5 is attached to the pivotal shaft 2d. Further, the pivotal shaft 2d is attached to a guide section 3c of a casing 3 for covering the upper portion of the monitor 1. On the other hand, a claw section 2a and an oblique side section 2c are formed in the other-end portion of the clamp 2, and the claw section 2a is rotated about the pivotal shaft 2d by the tension in the direction indicated by arrow A' of the spring 5 to thereby lock the locking hole 1b of the monitor 1. Further, a striker 2b is formed between the pivotal shaft 2d and the claw section 2a of the clamp 2.

A push latch 4 is provided vertically from the casing 3, and a striker holding section 4a is operated vertically to the push latch.

Next, the operation of the monitor opening/closing and holding mechanism will be described.

In opening the monitor 1, the side of the rotational distal end of the monitor 1 in the closed state by a user is upwardly (in the direction of arrow P) pushed as shown in FIG. 4b. Then, the lower projecting section 1d provided in the monitor 1 pushes up the oblique side section 2c against the tension of the spring 5, and the clamp 2 is upwardly rotated about the pivotal shaft 2d. At that time, the striker holding section 4a of the push latch 4 is tilted to engage with the striker 2b of the clamp 2, and be upwardly pushed up together with the clamp 2 while maintaining the engagement.

When the monitor 1 abuts against the bottom face of the guide section 3c of the casing 3 to be stopped, the striker 2b of the clamp 2 is moved to the locking point of the push latch 4 to be in the position held by the striker holding section 4a. At that time, when a user stops pushing the monitor 1 in the direction of arrow P, the striker 2b of the clamp 2 is locked in the position (the position shown in FIG. 4 (c)) somewhat thrust back by the striker holding section 4a. When the push latch 4 is in the engagement locked position, the lock between the locking hole 1b of the monitor 1 and the claw section 2a of the clamp 2 is completely removed, and thus the monitor 1 can be released and opened downwardly.

In closing the monitor 1, as shown in FIG. 4(c), the side of the rotational distal end of the monitor 1 in the state opened by a user is upwardly (in the direction of arrow P) pushed. Since the engagement lock is maintained with the clamp 2 drawn by the push latch 4, the upper projecting section 1c of the monitor 1 passes through the oblique side section 2c and the claw section 2a of the clamp 2 without coming in contact with those sections, and the lower projecting section 1d that is longer the than upper projecting section 1c comes in contact with the oblique side section 2c. Then, the lower projecting section 1d pushes up the oblique side section 2c against the tension of the spring 5, and the clamp 2 is upwardly rotated about the pivotal shaft 2d. At that time, the striker holding section 4a of the push latch 4 that is engaged with the striker 2b is also upwardly moved together with the clamp 2 to be pushed to the unlocking point. When the push latch 4 is lock-released, the lock-released clamp 2 is rotated in the direction of arrow A' by the tension of the spring 5, and the claw section 2a locks the locking hole 1b to hold the monitor 1 in the closed position. Therefore, even when a user stops pushing the monitor 1 in the direction of arrow P, the monitor remains in the closed position shown in FIG. 4(a).

When the monitor 1 is in the closed position, the load of the monitor 1 is applied to the monitor 1 and the guide section 3c of the casing 3, and the load is not applied to the push latch 4. Moreover, the load applied to the push latch 4 is equal to the tension in the direction of arrow A' of the spring 5, and the load can be adjusted by changing the distance from the pivotal shaft 2d of the clamp 2 to the striker 2b. Furthermore, in the first embodiment, the holding force for locking the monitor 1 is equal to the tension in the direction of arrow A of the spring 5; however, since the clamp 2 is rotationally moved in the second embodiment, the holding force is not equal to the tension of the spring 5, and the holding force can be adjusted by the change of the distance from the pivotal shaft 2d of the clamp 2 to the claw section 2a. Further, by the changes of the distance from the pivotal shaft 2d of the clamp 2 to the striker 2b and the distance from the pivotal shaft 2d to the claw section 2a, the amount of pushing the monitor 1 and the engagement allowance for engaging the claw section 2a and the locking hole 1b to each other can be adjusted, thus implementing a saving space. Therefore, flexibility in design can be increased.

As discussed above, according to the second embodiment, the monitor opening/closing and holding mechanism is arranged to include: the monitor 1 that is substantially horizontally held by the casing 3, and also downwardly rotated about the rotation shaft 1a to be opened; the locking hole 1b formed in the face of the rotational distal end opposite to the side thereof where the rotation shaft 1a of the monitor 1 is provided; the clamp 2 on one end side of which the claw section 2a for locking the locking hole 1b is formed and on the other end side of which the pivotal shaft 2d for rotationally moving the claw section 2a is formed, wherein the striker 2b is formed between the claw section 2a and the pivotal shaft 2d, and the pivotal shaft 2d is rotationally movably held by the guide section 3c of the casing 3; the push latch 4 attached to the casing 3 and having the striker holding section 4a for engaging with the striker 2b, wherein in cooperation with the upward rotation movement of the monitor 1 that is in the position held by the casing 3, the clamp 2 is rotationally moved toward the push latch 4 to thereby disengage the claw section 2a from the locking hole 1b, thus making the monitor 1 rotatable, and also the striker holding section 4a engages with the striker 2b to be forced into the main body of the push latch 4 to be in the engagement locked position, and further in cooperation with the upward rotation movement of the monitor 1 that is in the opened position, the clamp 2 is rotationally moved toward the push latch 4, and the striker holding section 4a that is in the engagement locked position with the striker 2b is forced into the main body of the push latch 4 to be in the engagement-lock releasing position; the spring 5 that always urges the clamp 2 toward the locking hole 1b, moves the clamp 2 by the engagement-lock releasing, and locks the claw section 2a in the locking hole 1b to substantially horizontally hold the monitor 1; and the lower projecting section 1d and the oblique side portion 2c that rotationally move the clamp 2 toward the push latch 4 in cooperation with the monitor 1 to be rotationally moved. Therefore, also in the arrangement where the clamp 2 is rotationally operated, as in the first embodiment discussed above, it can be configured that the monitor 1 is supported by the clamp 2 and the guide section 3c of the casing 3 rather than the push latch 4. Consequently, through the use of the small push latch 4, the heavy monitor 1 can be opened and closed by the push action, and also held in the casing 3 in the closed position. Further, it becomes possible to secure a large holding force through the use of the small push latch 4; thus, it becomes possible to dispose the monitor opening/closing and holding mechanism in a small mounting space within the casing 3, thereby implementing reduction in size of the product and increasing flexibility in design thereof.

Figure 5:
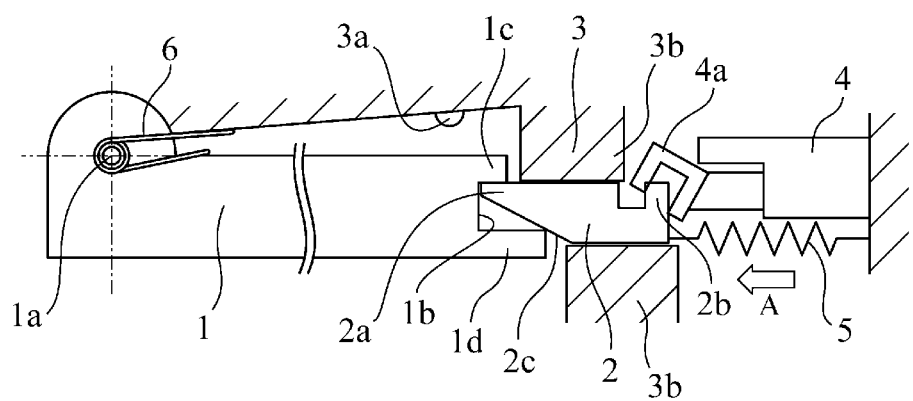
FIG. 5 is a side view showing an arrangement where a cover urging unit is provided on the monitor opening/closing and holding mechanism shown in FIG. 1.

Additionally, in the first and second embodiments discussed above, to open the monitor to any desired angle automatically, a cover urging unit for imparting a tension in the opening direction to the monitor may be provided therein. FIG. 5 is a side view showing an arrangement where the monitor opening/closing and holding mechanism according to the first embodiment is provided with the cover urging unit, and in FIG. 5, the parts similar or corresponding to those of FIG. 1 are designated by similar numerals, and explanations thereabout will be omitted. In FIG. 5, a spring 6 is provided for the cover urging unit; the spring 6 downwardly urges and opens the monitor 1, which has been rotatable where the claw section 2a of the clamp 2 is disengaged from the locking hole 1b. The spring 6 is also applicable to the monitor opening/closing and holding mechanism of the second embodiment.

However, when the monitor is large in weight, it is necessary to impart a larger tension in the opening direction to the monitor. Even in that case, when the display apparatus uses the monitor opening/closing and holding mechanism of the first or the second embodiment, the self-weight of the monitor and the tension of the cover urging unit are applied to the casing and the clamp, and thus the load to be applied to the push latch is not increased. Therefore, the holding force for holding a heavy cover in the closed position can be secured by a small push latch.

INDUSTRIAL APPLICABILITY

As discussed above, since the cover opening/closing and holding mechanism according to the present invention is arranged such that the weight of the cover is supported by the clamp and the casing instead of the small push latch, it is suitable for use in a cover opening/closing and holding mechanism for opening and closing a heavy cover such as a monitor of a vehicle ceiling-mounted display apparatus used for a rear seat.

The invention claimed is:

1. A cover opening/closing and holding mechanism comprising:

a cover that is substantially horizontally held by a casing, and also downwardly rotated about a rotation shaft to be opened;

a cover locking hole formed in a face of a rotational distal end of the cover opposite to the side where the rotation shaft is provided;

a clamp on one end side of which a clamp claw section for locking the cover locking hole is formed and on the other end side of which a striker is formed, and which is held by the casing to enable a reciprocating rectilinear motion;

a push latch attached to the casing and having a striker holding section for engaging with the striker, wherein in cooperation with the upward rotation movement of the cover that is in the position held by the casing, the clamp is rectilinearly moved toward the push latch to thereby disengage the clamp claw section from the cover locking hole, thus making the cover rotatable and also the striker holding section engages with the striker to be forced into the main body of the push latch to be in an engagement locked position, and further in cooperation with the upward rotation movement of the cover that is in the opened position, the clamp is rectilinearly moved toward the push latch, and the striker holding section that is in the engagement locked position with the striker is forced into a main body of the push latch to be in an engagement-lock releasing position; and an urging unit that always urges the clamp toward the cover locking hole, moves the clamp by the engagement-lock releasing position, and locks the clamp claw section in the cover locking hole to substantially horizontally hold the cover; wherein the clamp has a clamp operation section that is provided between the clamp and the cover contacts the cover to converge a rotational movement of the cover to a rectilinear movement of the clamp toward the push latch.

2. The cover opening/closing and holding mechanism according to claim 1, wherein the clamp operation section is an oblique side portion where the lower face of the clamp claw section tapers toward the tip thereof, and a lower projection of the cover locking hole abuts against the oblique side portion when the cover is rotationally moved.

3. The cover opening/closing and holding mechanism according to claim 1, further comprising a cover urging unit for rotating the cover in the opening direction when the clamp claw section is disengaged from the cover locking hole to be rotatable.

4. A cover opening/closing and holding mechanism comprising:

a cover that is substantially horizontally held by a casing, and also downwardly rotated about a rotation shaft to be opened;

a cover locking hole formed in a face of a rotational distal end of the cover opposite to the side where the rotation shaft is provided;

a clamp on one end side of which a clamp claw section for locking the cover locking hole is formed and on the other end side of which a clamp pivotal shaft for rotationally moving the clamp claw section is formed, wherein a striker is formed between the clamp claw section and the clamp pivotal shaft to be rotationally movably held by the casing;

a push latch attached to the casing and having a striker holding section for engaging with the striker, wherein in cooperation with the upward rotation movement of the cover that is in the position held by the casing, the clamp is rotationally moved toward the push latch to thereby disengage the clamp claw section from the cover locking hole, thus making the cover rotatable and also the striker holding section engages with the striker to be forced into a main body of the push latch to be in an engagement locked position, and further in cooperation with the upward rotation movement of the cover that is in the opened position, the clamp is rotationally moved toward the push latch, and the striker holding section that is in the engagement locked position with the striker is forced into the main body of the push latch to be in an engagement-lock releasing position; and an urging unit that always urges the clamp toward the cover locking hole, moves the clamp by the engagement-lock releasing position, and locks the clamp claw section in the cover locking hole to substantially horizontally hold the cover; wherein the clamp has a clamp operation section that contacts the cover to converge a rotational movement of the cover to a rotational movement of the clamp toward the push latch.

5. The cover opening/closing and holding mechanism according to claim 4, wherein the clamp operation section is an oblique side portion where the lower face of the clamp claw section tapers toward the tip thereof, and a lower projection of the cover locking hole abuts against the oblique side portion when the cover is rotationally moved.

6. The cover opening/closing and holding mechanism according to claim 4, further comprising a cover urging unit for rotating the cover in the opening direction when the clamp claw section is disengaged from the cover locking hole to be rotatable.

* * * * *

UNITED STATES PATENT AND TRADEMARK OFFICE
CERTIFICATE OF CORRECTION

PATENT NO. : 8,820,573 B2
APPLICATION NO. : 13/319094
DATED : September 2, 2014
INVENTOR(S) : Kazuhiro Tsuzuki et al.

It is certified that error appears in the above-identified patent and that said Letters Patent is hereby corrected as shown below:

IN THE CLAIMS:

In Claim 1, at Column 9, lines 40-41, change "the clamp has a clamp operation section that is provided between the clamp and the cover contacts the cover to" to read --the clamp has a clamp operation section that contacts the cover to--.

Signed and Sealed this
Thirteenth Day of January, 2015

Michelle K. Lee
*Deputy Director of the United States Patent and Trademark Office*